(12) United States Patent
Chien (10) Patent No.: US 6,392,879 B1
(45) Date of Patent: May 21, 2002

(54) DISK DRIVE MOUNTING DEVICE FOR A PORTABLE COMPUTER

(75) Inventor: Chung-Chi Chien, Taipei (TW)

(73) Assignee: Compal Electronics, Inc., Taipei (TW)

(*) Notice: Subject to any disclaimer, the term of this patent is extended or adjusted under 35 U.S.C. 154(b) by 0 days.

(21) Appl. No.: 09/526,080

(22) Filed: Mar. 15, 2000

(51) Int. Cl.⁷ .................................................. H05K 7/14
(52) U.S. Cl. ........................ 361/685; 361/683; 361/684; 439/928.1; 312/223.1; 312/223.2
(58) Field of Search .................................. 361/684–686, 361/724–727, 754; 439/53, 152, 153, 160, 157, 928.1; 248/27.1, 27.3; 312/223.1, 223.2, 265.6

(56) References Cited

U.S. PATENT DOCUMENTS

| | | | | |
|---|---|---|---|---|
| 5,211,459 A | * | 5/1993 | Wu | 312/223.2 |
| 5,332,306 A | * | 7/1994 | Babb et al. | 312/334.16 |
| 5,340,340 A | * | 8/1994 | Hastings et al. | 439/64 |
| 5,485,348 A | * | 1/1996 | Oros | 361/685 |
| 5,513,069 A | * | 4/1996 | Ohgami et al. | 361/685 |
| 5,768,099 A | * | 6/1998 | Radloff et al. | 361/685 |
| 5,995,365 A | * | 11/1999 | Broder et al. | 361/685 |
| 6,061,244 A | * | 5/2000 | O'Sullivan et al. | 361/727 |
| 6,115,243 A | * | 9/2000 | Horii | 361/685 |
| 6,158,699 A | * | 12/2000 | Boe | 248/27.1 |
| 6,208,506 B1 | * | 3/2001 | Pao | 361/683 |
| 6,217,359 B1 | * | 4/2001 | Chang | 439/297 |
| 6,222,727 B1 | * | 4/2001 | Wu | 361/685 |
| 6,252,765 B1 | * | 6/2001 | Balzaretti et al. | 361/683 |
| 6,262,883 B1 | * | 7/2001 | Kim | 361/680 |

* cited by examiner

Primary Examiner—Leo P. Picard
Assistant Examiner—David Foster
(74) Attorney, Agent, or Firm—Pillsbury Winthrop LLP (57) ABSTRACT

A drawer-type mounting device is adapted to mount a disk drive in a computer housing. The mounting device includes a lower case, an upper case, and a pulling member. The lower case has a first base plate with a first front end and a notch that extends rearwardly from the first front end. The upper case has a second base plate disposed slidably on the first base plate. The second base plate has a trench part which projects downward into the notch. The trench part has a guide rail unit that extends along a direction parallel to a line extending rearwardly from the first front end. The pulling member is mounted slidably in the trench part, and is guided by the guide rail unit for movement relative to the second base plate so as to move the upper case relative to the lower case.

8 Claims, 7 Drawing Sheets

DISK DRIVE MOUNTING DEVICE FOR A PORTABLE COMPUTER

BACKGROUND OF THE INVENTION

1. Field of the Invention

This invention relates to a disk drive mounting device, more particularly to a disk drive mounting device adapted to mount a disk drive in a computer housing.

2. Description of the Related Art

Notebook computers normally incorporate a CD-ROM drive or a high density floppy disk drive. The CD-ROM drive or the floppy disk drive is normally mounted in a computer housing through a slot in the housing via mounting means. Conventionally, the insertion and removal of the CD-ROM drive or the floppy disk drive through the slot in the computer housing is relatively inconvenient due to poor design of the aforesaid mounting means.

SUMMARY OF THE INVENTION

Therefore, the object of the present invention is to provide a drawer-type mounting device that is adapted to mount a CD-ROM drive or a floppy disk drive in a notebook computer and that is capable of overcoming the aforementioned problem.

Accordingly, a drawer-type mounting device of this invention is adapted to mount a disk drive in a computer housing and comprises: an open lower case adapted to be mounted securely in the computer housing, the lower case including a first base plate which has a first front end adjacent to the slot, and a notch which extends rearwardly from the first front end; an open upper case inserted slidably and removably in the lower case and adapted to carry the disk drive, the upper case having a second base plate disposed slidably on the first base plate, the upper case being movable frontward and rearward through the first front end, the second base plate having a trench part which projects downward into the notch from the second base plate, the trench part having guide rail means that extends along a direction parallel to a line extending rearwardly from the first front end; and a pulling member mounted slidably in the trench part and guided by the guide rail means for movement relative to the second base plate between a first position in which the pulling member is pushed rearwardly and inwardly of the slot of the computer housing and a second position in which the pulling member is drawn frontwardly and outwardly of the slot of the computer housing, the pulling member having engaging means for engaging the trench part when the pulling member reaches the first and second positions, thereby moving the upper case relative to the lower case.

BRIEF DESCRIPTION OF THE DRAWINGS

In drawings which illustrate an embodiment of the invention.

DETAILED DESCRIPTION OF THE PREFERRED EMBODIMENT

FIGS. 1 to 5 illustrate a drawer-type mounting device 100 embodying this invention. The mounting device 100 is adapted to mount a CD-ROM drive or a floppy disk drive in a computer housing 1 of a portable computer, such as a notebook computer, and can be drawn out of or pushed into the computer housing 1 through a slot 10 in the computer housing 1. The mounting device 100 includes an open lower case 2 adapted to be mounted securely on an electrical circuit board 12 in the computer housing 1, an open upper case 3 inserted slidably and removably in the lower case 2 and adapted to carry a disk drive 5 (see FIG. 7), and a pulling member 4 mounted slidably on the upper case 3.

Figure 1:
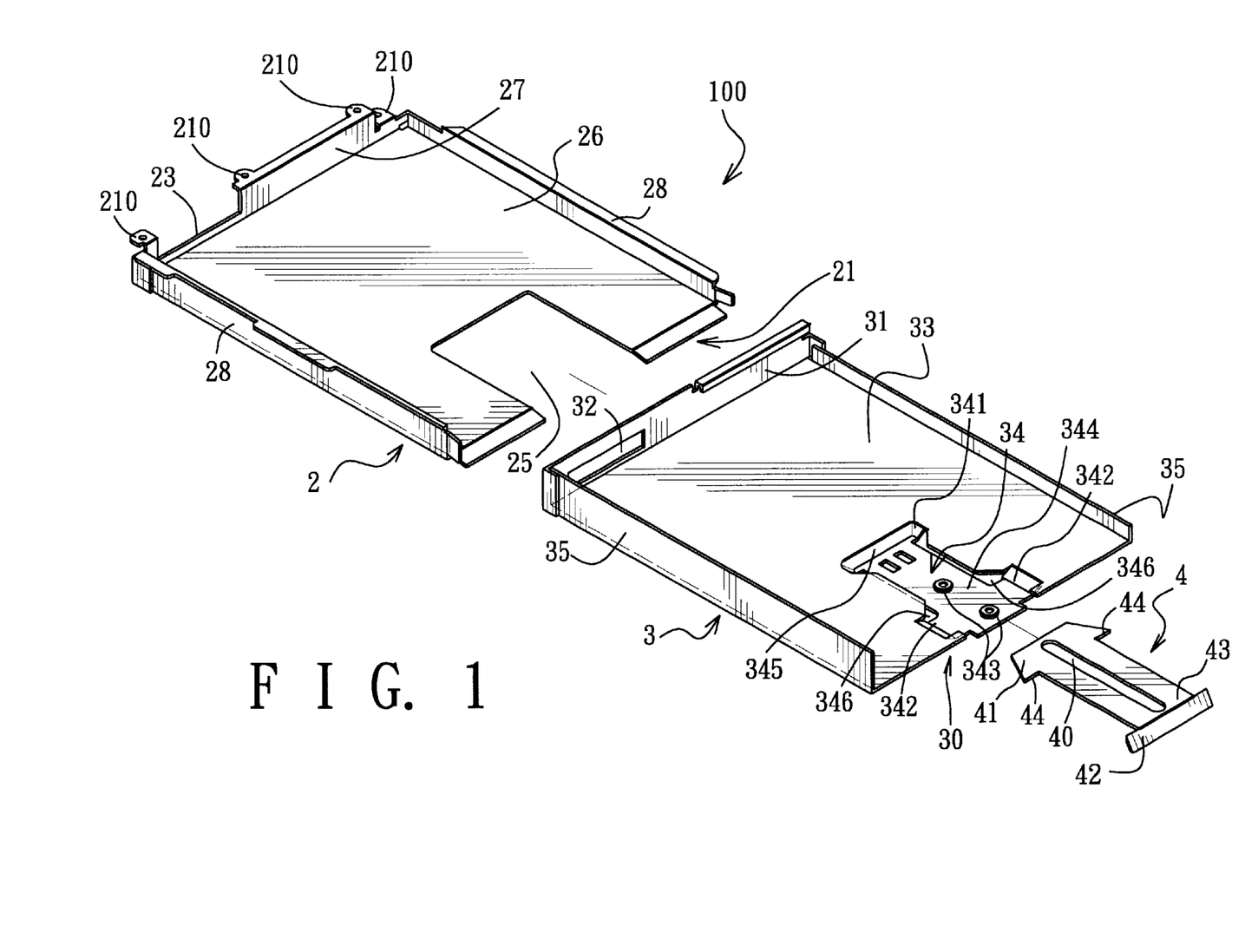
FIG. 1 is an exploded view of a drawer-type mounting device embodying this invention.
Figure 2:
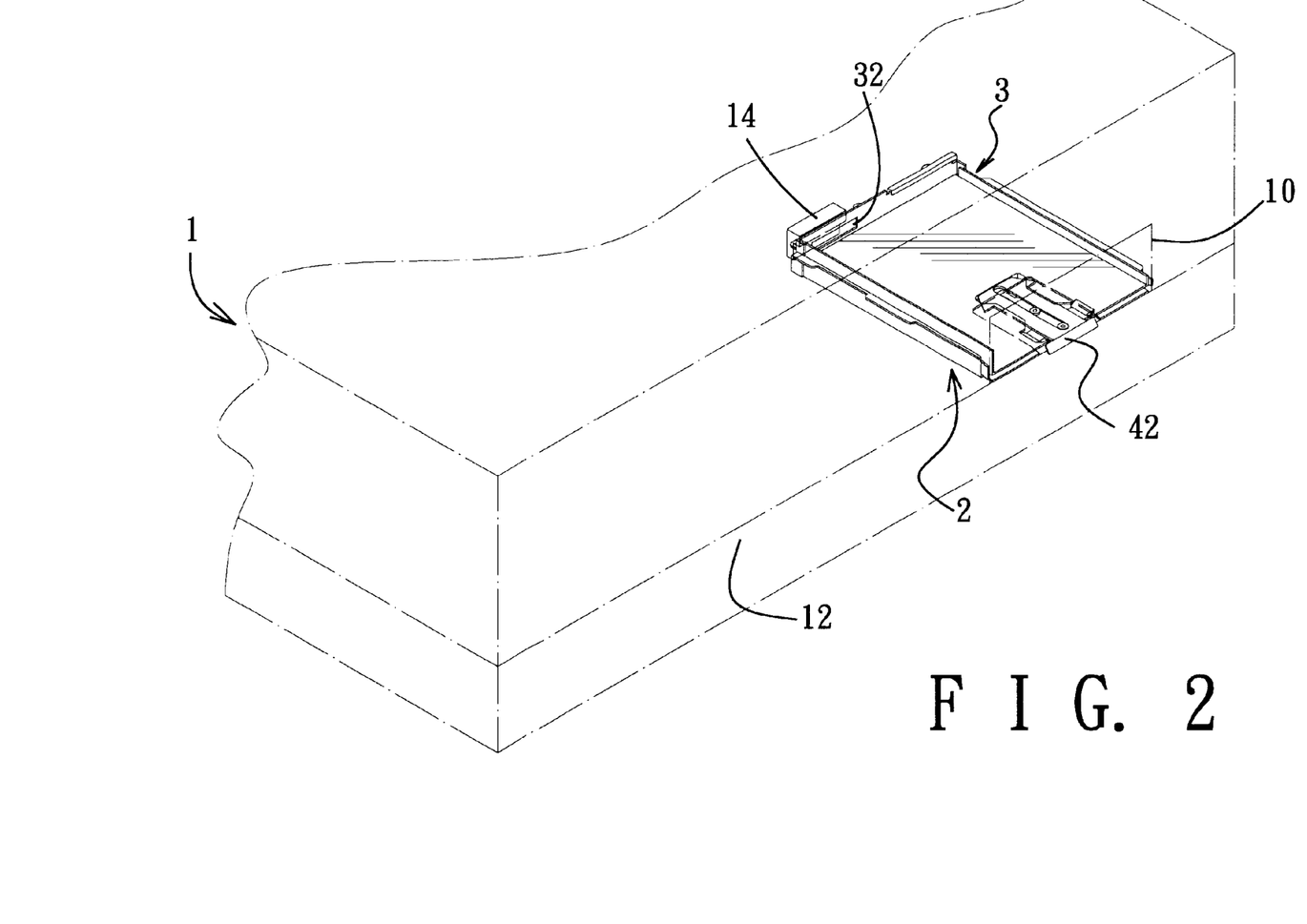
FIG. 2 is a schematic perspective view illustrating the drawer-type mounting device of FIG. 1 when mounted in a computer housing.
Figure 3:
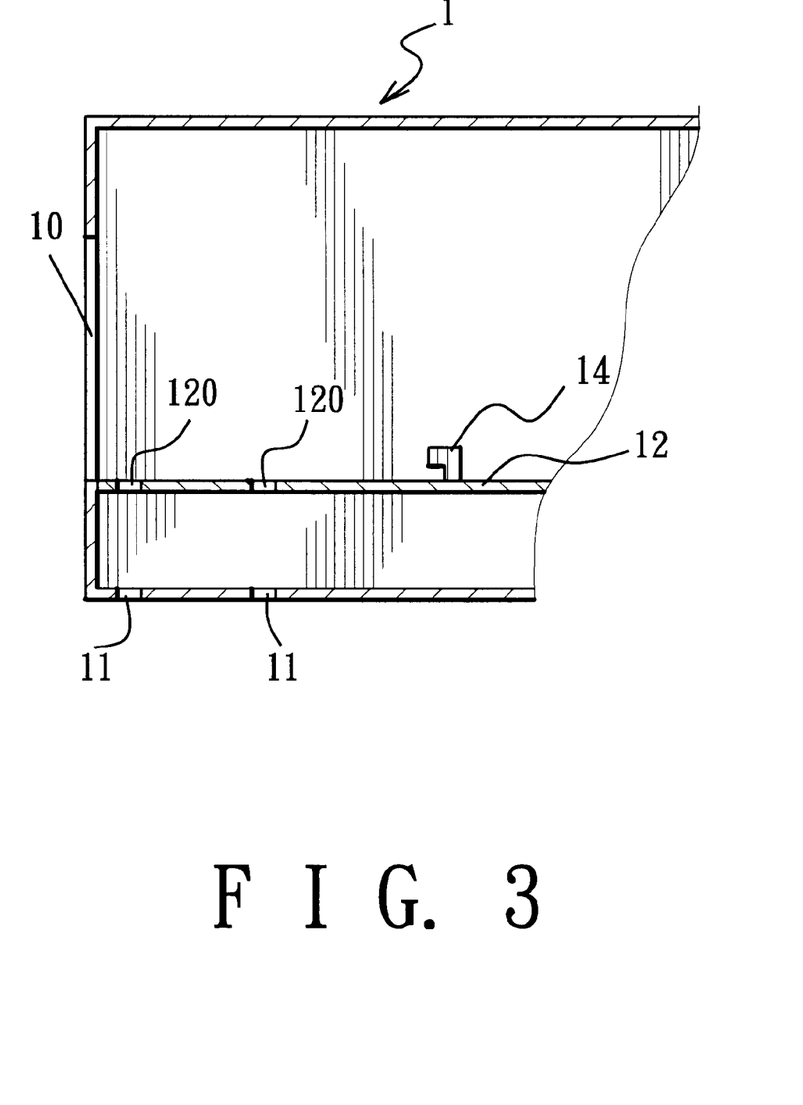
FIG. 3 is a fragmentary sectional view of the computer housing of FIG. 2.
Figure 4:
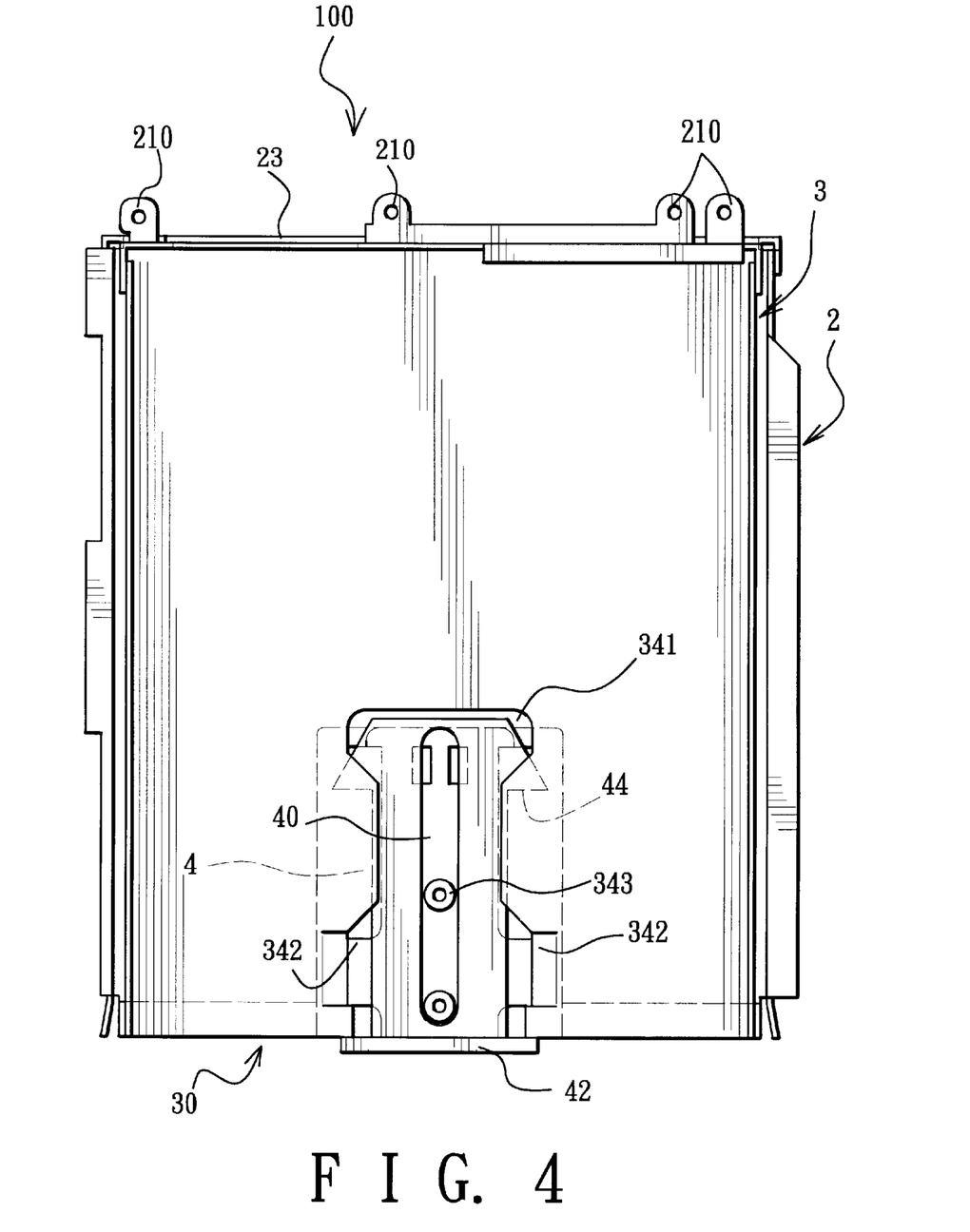
FIG. 4 is a top view of the drawer-type mounting device of FIG. 1 in a mounting position.
Figure 5:
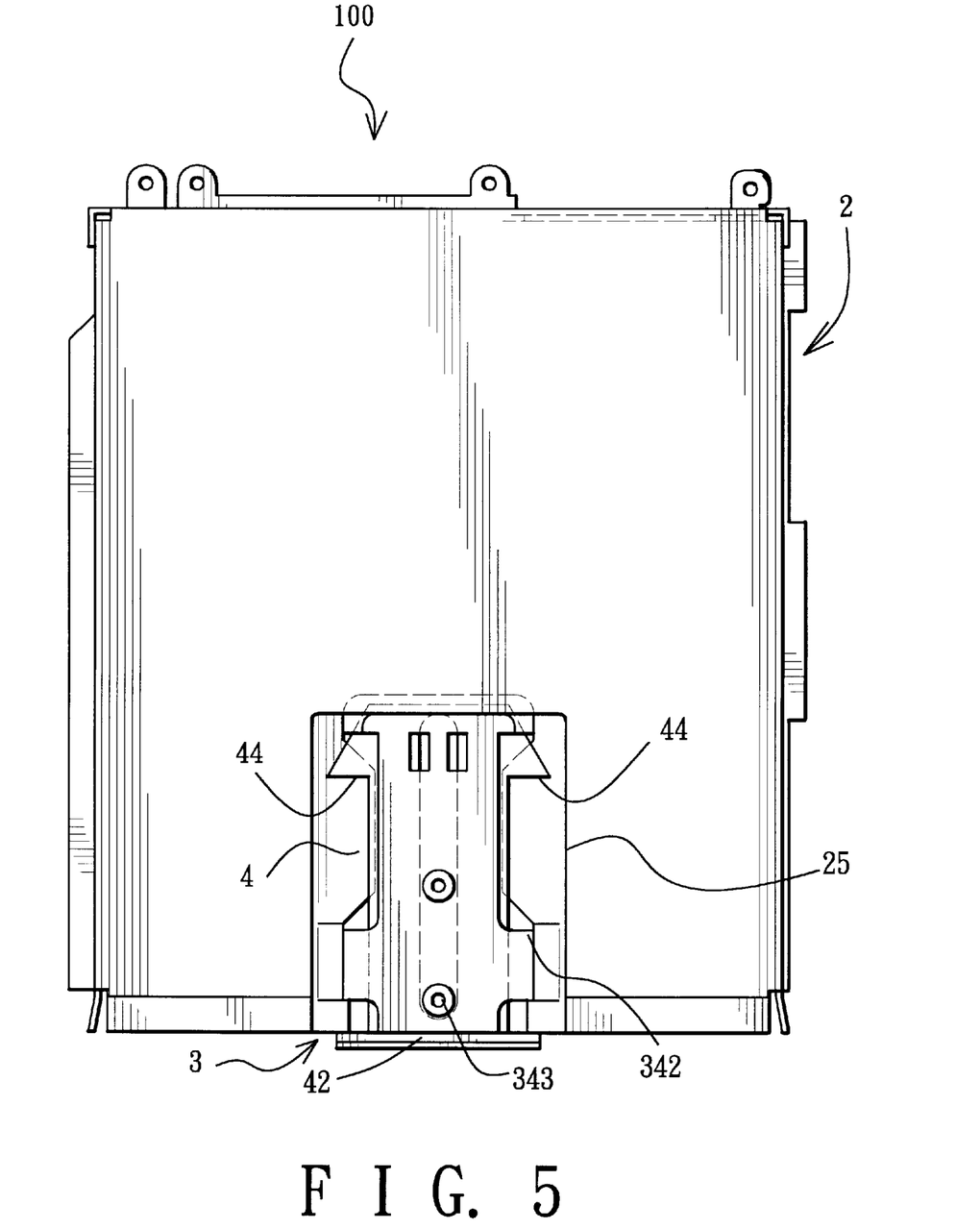
FIG. 5 is a bottom view of the drawer-type mounting device of FIG. 1 in a mounting position.

The lower case 2 has a first base plate 26, two opposite first side walls 28 projecting uprightly from two opposite sides of the first base plate 26, and a first rear wall 27 projecting uprightly from the first base plate 26 and interconnecting the opposite first side walls 28. The first base plate 226 has a first front end 21 opposite to the first rear wall 27 and adjacent to the slot 10, and a notch 25 extending rearwardly from the first front end 21 toward the first rear wall 27 between the opposite first side walls 28. A first rear opening 23 is formed in the first rear wall 27, and is aligned with an electrical connection port 14 that projects uprightly from the electrical circuit board 12 when the lower case 2 is mounted on the electrical circuit board 12. A plurality of lugs 210 project rearwardly from the first rear wall 27 so that the lower case 2 can be fastened on the electrical circuit board 12 via screw means passing through the lugs 210.

The upper case 3 is movable frontwardly and rearwardly through the first front end of the first base plate 26, and has a second base plate 33 disposed slidably on the first base plate 26, two opposite second side walls 35 projecting uprightly from two opposite sides of the second base plate 33, and a second rear wall 31 projecting uprightly from the second base plate 33 and interconnecting the opposite side walls 35. The second base plate 33 has a second front end 30 opposite to the second rear wall 31, and a trench part 34 projecting downwardly therefrom into the notch 25 of the first base plate 26 and extending rearwardly from the second front end 30 toward the second rear wall 31. The trench part 34 is formed by punching the second base plate 33, and has a bottom wall 344 disposed below the second base plate 33, two opposite trench front side walls 342 extending upwardly from two opposite sides of the bottom wall 344 to the second base plate 33 adjacent to the second front end 30, two opposite trench rear side walls 341 opposite to the trench front side walls 342 and extending upwardly from two opposite sides of the bottom wall 344 to the second base plate 33, a rear wall 345 extending upwardly from the bottom wall 344 to the second base plate 33 and interconnecting the opposite trench rear side walls 341, and two opposite slits 346 formed between the trench front and rear side walls 342, 341 and between the second base plate 33 and the bottom wall 344 and extending along a direction parallel to a line that extends rearwardly from the second front end 30 toward the second rear wall 31 to serve as a guide rail means. Spaced apart front and rear positioning guides 343 project upwardly from the bottom wall of the trench part 34 between opposite slits 346 adjacent to the second front end 30 of the second base plate 33, and have inner threads formed therein. A second opening 32 is formed in the second rear wall 31, and is aligned with the first opening 23 in the first rear wall 27 of the lower case 2 when the upper case 3 is inserted into the lower case 2.

Figure 6:
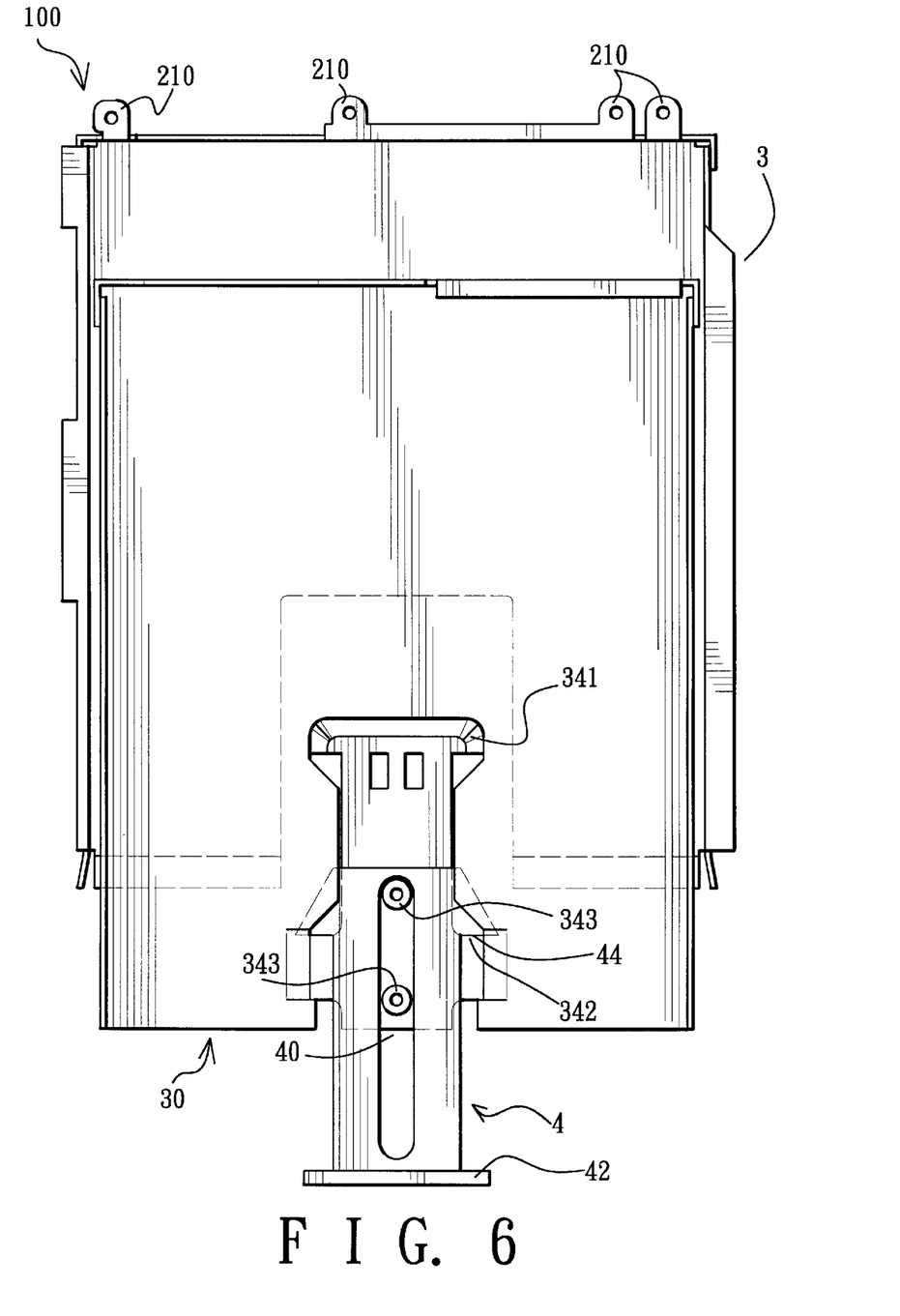
FIG. 6 is a top view of the drawer-type mounting device of FIG. 1 in a dismounting position.

The pulling member 4 is movable frontwardly and rearwardly through the second front end 30 of the second base plate 33, and is in the form of a pulling plate that is guided by the opposite slits 346 in the trench part 34, and that has an enlarged head portion 41, a tail end 43 opposite to the head portion 41, and an elongated slot 40 that is formed between the head portion 41 and the tail end 43 for receiving the positioning guides 343 so that the pulling member 4 can be positioned slidably in the trench part 34. The tail end 41 is provided with a handle 42. The head portion 43 has two opposite wings 44 that project outwardly and respectively from two opposite sides thereof into the opposite slits 346 to serve as engaging means for engaging the trench part 34. The pulling member 4 is movable relative to the second base plate 33 between a first position in which the pulling member 4 is pushed rearwardly and inwardly of the slot 10 in the computer housing 1, and a second position in which the pulling member 4 is drawn frontwardly and outwardly of the slot 10 in the computer housing 1. The opposite wings 44 of the head portion 41 of the pulling member 4 engage respectively the opposite trench rear side walls 341 when the puling member 4 moves to the first position (see FIG. 4), and engage respectively the opposite trench front side walls 342 when the puling member 4 moves to the second position (see FIG. 6), thereby moving the upper case 3 relative to the lower case 2.

Figure 7:
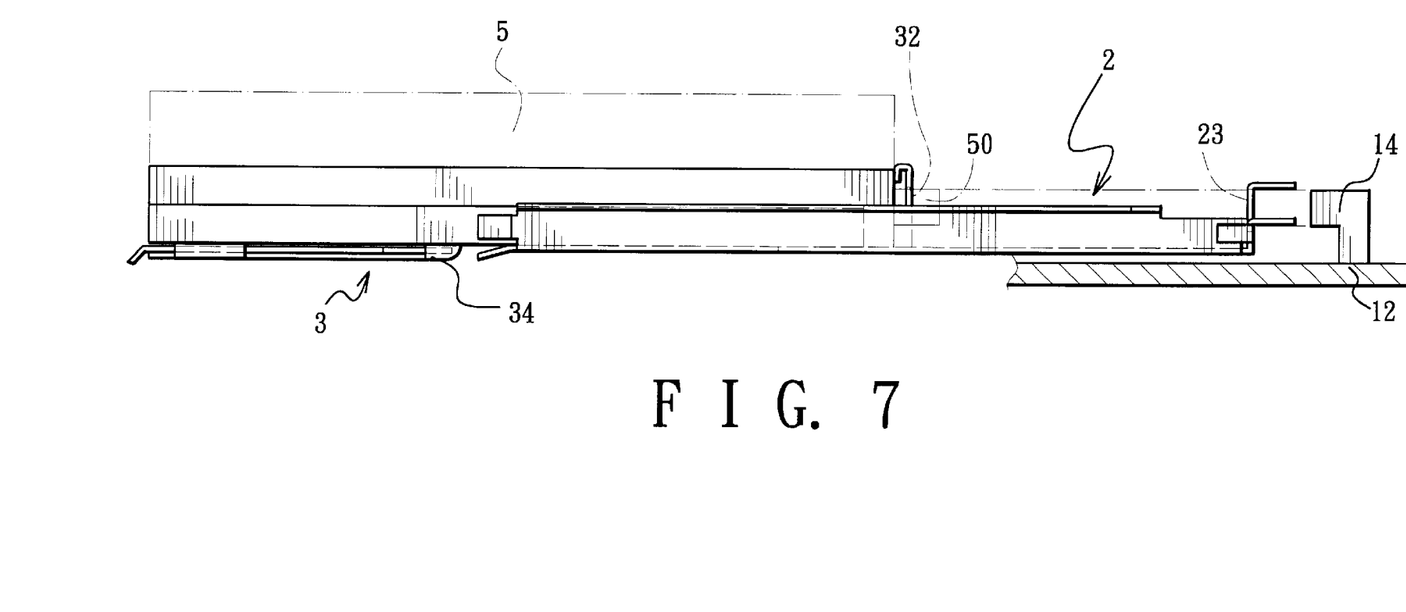
FIG. 7 is a fragmentary side view illustrating the drawer-type mounting device of FIG. 1 when mounted in the computer housing.

Referring now to FIG. 7 in combination with FIGS. 1 to 4, after the lower case 2 is fastened to the electrical circuit board 12 in the computer housing 1 via screw means passing through the lugs 210, the disk drive 5 is mounted securely on the second base plate 33 with a connector port 50 of the disk drive 5 projecting therefrom through the second opening 32 in the second rear wall 31, and is inserted slidably into the lower case 2 in the computer housing 1 together with the upper case 3 by pushing the pulling member 4 rearwardly to the above described first position in the trench part 34 of the upper case 3. After the upper case 3 is positioned on the first base plate 26 of the lower case 2, the connector port 50 of the disk drive 5 will project through the first opening 23 in the first rear wall 27 to connect electrically with the electrical connection port 14 on the electrical circuit board 12 in the computer housing 1. The upper case 3 is then fastened to the electrical board 12 via screw means which passes through through-holes 11 in a bottom side of the computer housing 1, and through-holes in the electrical circuit board 12, and which extends into and engages threadedly the inner threads of the positioning guides 343 of the trench part 34.

With the invention thus explained, it is apparent that various modifications and variations can be made without departing from the spirit of the present invention. It is therefore intended that the invention be limited only as recited in the appended claims.

I claim:

1. A disk drive mounting device adapted to mount a disk drive in a housing of a portable computer through a slot in the housing, comprising:

an open lower case adapted to be mounted securely in the housing through the slot and having a first base plate, said first base plate having a first front end adjacent to the slot, and a notch extending rearwardly from said first front end between two opposite sides of said first base plate;

an open upper case inserted slidably and removably in said lower case and adapted to carry the disk drive, said upper case having a second base plate which is disposed on said first base plate and which has a second front end and a trench part that extends rearwardly from said second front end and that projects downwardly from said second base plate between two opposite sides of said second base plate, said trench part being received slidably in said notch when said upper case is inserted in said lower case, said trench part having a bottom wall disposed below said second base plate, two opposite trench side walls which project upwardly and respectively from two opposite sides of said bottom wall, and two opposite slits that are formed respectively in said opposite trench side walls and that extend in a direction parallel to a line extending rearwardly from said first front end; and a pulling member mounted slidebaly on said trench part, said pulling member being movable relative to said upper case between a first position in which said pulling member is pushed rearwardly and inwardly of the slot in the housing and a second position in which said pulling member is drawn frontwardly and outwardly of the slot in the housing, said pulling member having an enlarged head portion that extends into and that is guided by said slits so as to engage said trench side walls when said pulling member reaches said first and second positions.

2. The disk drive mounting device of claim 1, wherein said bottom wall of said trench part further has spaced apart front and rear positioning guides projecting upwardly therefrom between said opposite sides of said bottom wall adjacent to said first front end of said first base plate, said pulling member being in the form of a plate, and further having a tail end which is opposite to said head portion and which is provided with a handle, and an elongated slot which is formed between said head portion and said tail end for receiving slidably said front and rear positioning guides.

3. The disk drive mounting device of claim 2, wherein said trench part is formed by punching said second base plate.

4. A drawer-type mounting device which is adapted to mount a disk drive in a computer housing and which can be drawn out of or pushed into the computer housing through a slot in the computer housing, said mounting device comprising:

an open lower case adapted to be mounted securely in the computer housing, said lower case including a first base plate which has a first front end adjacent to the slot, and a notch which extends rearwardly from said first front end;

an open upper case inserted slidably and removably in said lower case and adapted to carry the disk drive, said upper case having a second base plate disposed slidably on said first base plate, said upper case being movable frontward and rearward through said first front end, said second base plate having a trench part which projects downward into said notch from said second base plate, said trench part having guide rail means that extends along a direction parallel to a line extending rearwardly from said first front end; and a pulling member mounted slidably in said trench part and guided by said guide rail means for movement relative to said second base plate between a first position in which said pulling member is pushed rearwardly and inwardly of the slot in the computer housing and a second position in which said pulling member is drawn frontwardly and outwardly of the slot in the computer housing, said pulling member having engaging means for engaging said trench part when said pulling member reaches said first and second positions, thereby moving said upper case relative to said lower case.

5. The drawer-type mounting device of claim 4, wherein said second base plate has a second front end, said trench part extending rearwardly from said second front end, and having a bottom wall disposed below said second base plate, a trench rear wall extending upwardly from said bottom wall to said second base plate, two opposite trench rear side walls extending upwardly from said bottom wall to said second base plate and connected side wise to said trench rear wall, and two opposite trench front side walls extending upwardly from said bottom wall to said second base plate adjacent to said second front end, said guide rail means including two opposite slits each of which is formed between said trench front and rear side walls and between said bottom wall and said second base plate.

6. The drawer-type mounting device of claim 5, wherein said pulling member includes a pull plate disposed slidably on said bottom wall, said pull plate having an enlarged head portion that has two opposite wings projecting oppositely and respectively therefrom into said slits to serve as said engaging means, said enlarged head portion engaging said trench rear side walls in said first position and engaging said trench front side walls in said second position.

7. The drawer-type mounting device of claim 6, wherein said bottom wall of said trench part further has spaced front and rear positioning guides projecting upwardly from said bottom wall between said slits adjacent to said second front end of said second base plate, said pull plate further having an elongated slot receiving said front and rear positioning guides, and a pull handle formed at a tail end of said pull plate opposite to said enlarged head portion.

8. The drawer-type mounting device of claim 4, wherein said lower case further includes two opposite first side walls extending upwardly from two opposite sides of said first base plate, and a first rear wall extending upwardly from a rear end of said first base plate opposite to said first front end, said first rear wall having a first opening adapted to communicate with an electrical connection port in the computer housing, said upper case further including two opposite second side walls extending upwardly from two opposite sides of said second base plate within and adjacent to said first side walls, and a second rear wall extending upwardly from said second base plate in front of said first rear wall, said second rear wall having a second opening aligned with said first opening.

\* \* \* \* \*